United States Patent
Vollert et al.

(10) Patent No.: US 9,592,809 B2
(45) Date of Patent: Mar. 14, 2017

(54) BRAKE SYSTEM FOR A MOTOR VEHICLE AND METHOD FOR CONTROLLING THE SAME

(75) Inventors: Herbert Vollert, Vaihingen/Enz (DE); Reinhard Weiberle, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 121 days.

(21) Appl. No.: 13/140,976

(22) PCT Filed: Nov. 16, 2009

(86) PCT No.: PCT/EP2009/065199
§ 371 (c)(1),
(2), (4) Date: Jun. 20, 2011

(87) PCT Pub. No.: WO2010/069689
PCT Pub. Date: Jun. 24, 2010

(65) Prior Publication Data
US 2011/0254357 A1    Oct. 20, 2011

(30) Foreign Application Priority Data

Dec. 18, 2008 (DE) .................. 10 2008 054 849
Jun. 16, 2009 (DE) .................. 10 2009 026 973

(51) Int. Cl.
*B60T 13/74* (2006.01)
*B60T 13/58* (2006.01)
(Continued)

(52) U.S. Cl.
CPC .............. *B60T 13/586* (2013.01); *B60T 1/10* (2013.01); *B60T 7/042* (2013.01); *B60T 8/447* (2013.01); *B60T 8/4872* (2013.01); *B60T 13/745* (2013.01)

(58) Field of Classification Search
CPC ........................ B60T 13/741; B60T 2220/04
(Continued)

(56) References Cited

U.S. PATENT DOCUMENTS 3,877,299 A * 4/1975 Clayton, Sr. .......... B60T 17/223
                                                  73/116.05
4,641,894 A * 2/1987 Belart ..................... B60T 8/446
                                                  303/114.1
(Continued)

FOREIGN PATENT DOCUMENTS

DE       19939950 A1 *  5/2000
DE       10057557 A1 * 12/2001
(Continued)

OTHER PUBLICATIONS

Abstarct and machine translation of DE10057557a1.*
Abstarct and machine translation of DE102004050103a1.*
English abstract of JP 60092151 A.*

*Primary Examiner* — Robert A Siconolfi
*Assistant Examiner* — Mahbubur Rashid
(74) *Attorney, Agent, or Firm* — Maginot, Moore & Beck LLP

(57) ABSTRACT

The invention relates to a hybrid brake system having a hydraulic service brake system and an electromechanical service brake system. According to the invention, a brake booster is designed as a pedal simulator, which can be used to boost power and to generate a pedal power which is counter to the direction of actuation. When the hydraulic service brake system fails, the electromechanical service brake system is used for braking and the brake booster generates a pedal power which allows or facilitates dosage of the brake actuation.

15 Claims, 2 Drawing Sheets

(51) Int. Cl.
    *B60T 1/10*     (2006.01)
    *B60T 7/04*     (2006.01)
    *B60T 8/44*     (2006.01)
    *B60T 8/48*     (2006.01)

(58) Field of Classification Search
    USPC ........ 303/3, 113.1–113.4, 115.2; 701/70, 78, 701/83, 96
    See application file for complete search history.

(56) References Cited

U.S. PATENT DOCUMENTS

| | | | | |
|---|---|---|---|---|
| 5,705,744 | A * | 1/1998 | Brugger | B60T 17/221 340/453 |
| 6,220,675 | B1 * | 4/2001 | Steffes | 303/116.2 |
| 2002/0158510 | A1 * | 10/2002 | Kobayashi et al. | 303/155 |
| 2003/0168909 | A1 | 9/2003 | Kusano | |
| 2005/0017574 | A1 | 1/2005 | Weiberle et al. | |
| 2005/0131613 | A1 * | 6/2005 | Bohm | B60T 8/3255 701/71 |
| 2006/0076829 | A1 * | 4/2006 | Mann | B60L 7/24 303/151 |
| 2006/0163941 | A1 * | 7/2006 | Von Hayn | B60T 7/042 303/155 |
| 2009/0115247 | A1 * | 5/2009 | Leiber | B60T 7/042 303/154 |

FOREIGN PATENT DOCUMENTS

| | | |
|---|---|---|
| DE | 10319663 A1 | 11/2004 |
| DE | 102004050103 A1 * | 4/2006 |
| FR | 2860474 A1 * | 4/2005 |
| JP | 60092151 A * | 5/1985 |
| JP | 2002-67909 A | 3/2002 |
| JP | 2007-131130 A | 5/2007 |
| WO | 2007080106 A1 | 7/2007 |
| WO | WO 2009068404 A2 * | 6/2009 |

* cited by examiner

BRAKE SYSTEM FOR A MOTOR VEHICLE AND METHOD FOR CONTROLLING THE SAME

CROSS-REFERENCE TO RELATED APPLICATION

This application is a 35 USC 371 application of PCT/EP2009/065199 filed on Nov. 16, 2009.

BACKGROUND OF THE INVENTION

Field of the Invention

The invention relates to a motor vehicle brake system and to a method for controlling the brake system.

Description of the Prior Art

The invention is provided for a so-called hybrid vehicle brake system, a term referring to a brake system that has a hydraulic service brake system and an additional for example electromechanical service brake system. For example, the hydraulic service brake system acts on the wheels of a front axle of a motor vehicle and the additional service brake system acts on the wheels of a rear axle. The hydraulic service brake system has a muscular force-actuatable master cylinder with a brake booster and one or more hydraulic wheel brakes that are connected to the master cylinder. If the additional service brake system is an electromechanical one, then it has one or more electromechanical wheel brakes. A hybrid brake system of this kind has been disclosed by patent application DE 103 19 663 A1.

ADVANTAGES AND SUMMARY OF THE INVENTION

The brake system according to the invention has a brake booster that not only boosts the actuating force, i.e. the muscular force exerted on the master cylinder in order to apply the brakes, but also can produce a force that counteracts the actuating force exerted on the master cylinder by a vehicle driver. The force that is produced by the brake booster and counteracts the actuating force is referred to here as the pedal force and acts, for example, on a (foot) brake pedal or a (hand) brake lever. With the invention, it is possible to produce a pedal force even when the master cylinder cannot build up any brake pressure in the hydraulic service brake system, for example due to a leak. When an insufficient pressure is built up in the hydraulic brake system due to a malfunction, the brake booster can be used to increase the pedal force. The brake booster in the brake system according to the invention simultaneously constitutes a pedal simulator for producing or boosting a pedal force that a vehicle driver must exert with muscular force in order to actuate the brake. Through the possibility of producing a pedal force with the brake booster, the invention enables a precisely controlled brake actuation in the event of a failure or malfunction of the hydraulic service brake system. The additional service brake system should produce a sufficient auxiliary braking action in the event of a failure of the hydraulic service brake system; technically speaking, though, this is not an absolute requirement for the invention, but rather a legal requirement for approval for road use. In this case, auxiliary braking means a braking of the motor vehicle with the additional service brake system in the event of a failure of the hydraulic service brake system. An advantage of the invention is the possibility of embodying the hydraulic service brake system as a single-circuit brake system because as mentioned above, an auxiliary braking is possible using the additional service brake system. A single-circuit brake system is simpler and less expensive than a dual-circuit brake system.

The additional service brake system can also be a hydraulic service brake system. Preferably, however, it is not a hydraulic service brake system or in any case is not an exclusively hydraulic service brake system, but is instead for example an electrohydraulic, pneumatic, or electropneumatic service brake system. In particular, an electromechanical service brake system is provided as an additional service brake system, which has one or more electromechanical wheel brakes. Electromechanical wheel brakes are known; for example, they have an electric motor with which, via a rotation/translation converting transmission, a friction brake lining can be pressed against a brake component such as a brake disc or brake drum. A reduction gear can be connected between the rotation/translation converting transmission and the electric motor. The rotation/translation converting transmission can, for example, be a spindle drive or also can simply have just one cam.

The invention provides a self-amplifying electromechanical wheel brake. Here, too, there are different known designs. One example of a self-amplifying electromechanical wheel brake is a drum brake with an electromechanical actuation and one or two leading brake shoes. For disc brakes, self-amplifying devices—e.g. with a wedge mechanism—are known, which use a wedge to support a friction brake lining in the rotation direction of a brake disc. When the brake is applied, the brake lining being pressed against the brake disc is acted on by the rotating disc, which moves it into a narrowing wedge gap, which increases the clamping force of the disc brake in accordance with the wedge principle. An example of a self-amplifying electromechanical disc brake with a wedge mechanism for self-amplification is given in patent application DE 100 56 451 A1. This enumeration of self-amplifying brakes is non-exhaustive.

For example, the brake booster can be a modified vacuum brake booster whose vacuum chamber can be ventilated, for example, by means of a solenoid valve. The vacuum chamber is situated on the master cylinder side of a working diaphragm of the brake booster and is not ventilated under normal circumstances. If the vacuum chamber is ventilated instead of the working chamber, as is done for a brake boosting, then the brake booster acts in a direction counter to the brake actuation. It is thus possible to produce the desired pedal force. One feature of the invention provides an electromechanical brake booster whose force can be electrically or electronically controlled, depending on the design. For an example of the electromechanical brake booster, refer to patent application DE 100 57 557 A1, which electromechanically produces a force with an electromagnet or a linear motor. The force of the brake booster is added to a muscular/actuating force exerted by a vehicle driver to apply the brakes. A different embodiment of an electromechanical brake booster is also conceivable, for example with an electric motor, which exerts a force via a transmission. The brake booster, however, must be embodied so that it is possible to produce a force in a direction counter to an actuating direction.

The invention further provides a method for controlling a hybrid brake system of the type explained above. The word "control" here is also used in the sense of a regulation. According to the method, the brake booster is used in its function as a pedal simulator and produces a pedal force if the master cylinder does not produce any brake pressure or does not produce the customary brake pressure when the brake system is actuated. When actuating the brake system, a vehicle driver feels a counteracting force, even if this force is not or is only partially generated by a brake pressure produced by the master cylinder. This permits a precisely controlled brake actuation in the event of a failure of the hydraulic service brake system with the additional service brake system. For control purposes, an actuation sensor system is proposed that is able to measure a brake actuation. This can be a pedal-travel sensor and a pedal-force sensor or a pressure sensor with which it is possible to measure the pedal force or brake pressure as a function of a pedal travel and to compare this to the values that are customary with a functioning brake system.

In the event of a failure of the hydraulic service brake system, the brake booster can be used to intentionally produce a pedal force that differs from the usual actuation force so that a vehicle driver notices that the brake system is not functioning properly, but is still able to apply the brakes in a precisely controlled fashion by means of the pedal force. In lieu of this one feature of the invention provides for the production of the usual actuating force with a given actuation travel; the malfunction of the hydraulic service brake system is not noticeable to a vehicle driver and must therefore be signaled for example by means of optical and/or acoustic indicators.

BRIEF DESCRIPTION OF THE DRAWINGS

The invention will be explained in detail below in conjunction with an exemplary embodiment shown in the drawings.

DESCRIPTION OF THE PREFERRED EMBODIMENT

Figure 1:
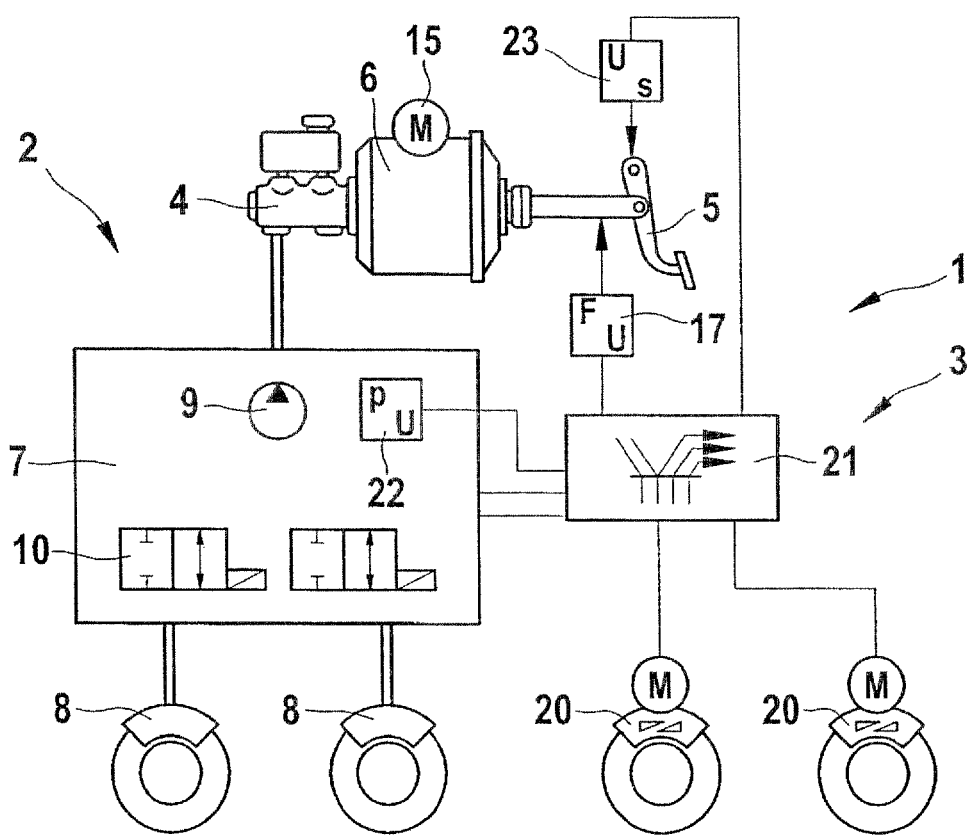
FIG. 1 is a schematic depiction of a motor vehicle brake system according to the invention.

The motor vehicle brake system 1 according to the invention shown in FIG. 1 includes a hydraulic service brake system 2 and an electromechanical service brake system 3. The hydraulic service brake system 2 is used, for example, to brake the wheels of a front axle and the electromechanical service brake system 3 is used to brake the wheels of a rear axle. The hydraulic service brake system 2 includes a master cylinder 4, which can be actuated with muscular force by means of a brake pedal 5. The master cylinder 4 has an electromechanical brake booster 6. Hydraulic wheel brakes 8 are connected to the master cylinder 4 via a hydraulic unit 7. The hydraulic unit 7 includes, among other things, a hydraulic pump 9 that is frequently also referred to as a return pump as well as solenoid valves 10 for an individual-wheel regulation of a wheel brake pressure and therefore an individual-wheel brake force control. Hydraulic units 7 of this kind are known as slip control systems for an antilock braking system, a traction control system, and/or an electronic stability program; these systems are known by the abbreviations ABS, TCS, and ESP. The hydraulic unit 7 is not required for the invention.

Figure 2:
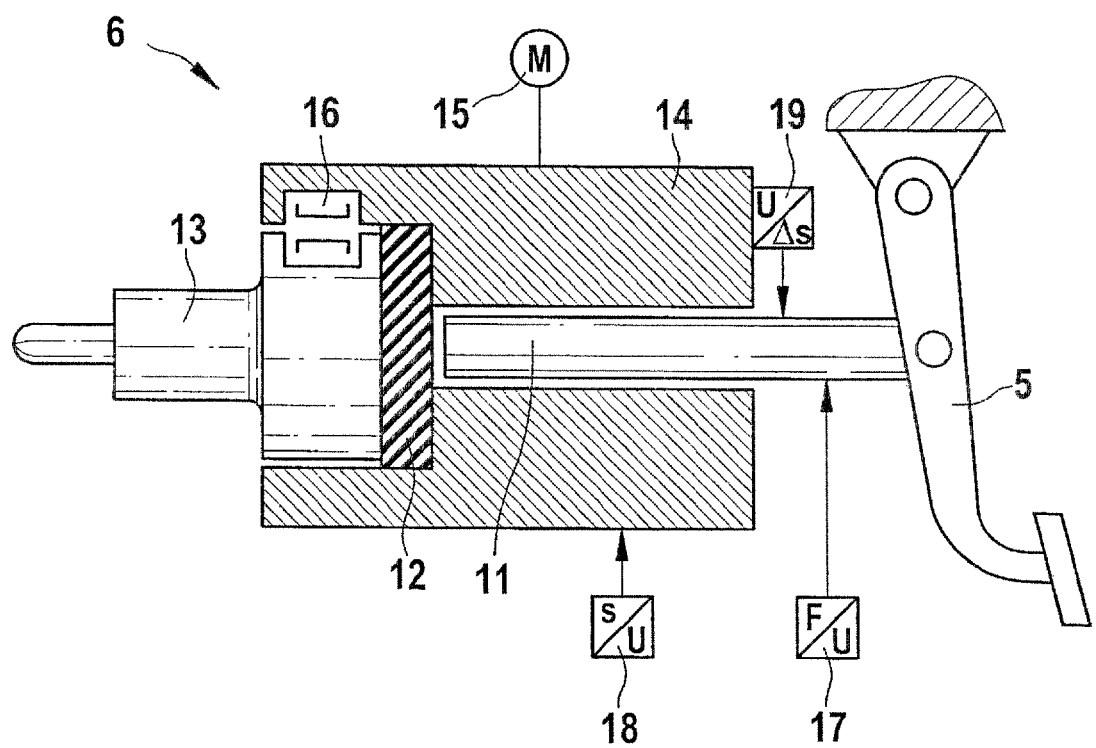
FIG. 2 is a schematic axial section through a brake booster of the brake system from FIG. 1.

FIG. 2 shows a simplified, schematic axial section through of an embodiment of the electromechanical brake booster 6. The brake booster 6 has a piston rod 11, which is connected in articulating fashion to the brake pedal 5 and via which a muscular force exerted on the brake pedal 5 can be transmitted to a push rod 13 via a reaction disc 12. The push rod 13 acts in the usual way on a piston of the master cylinder 4, not shown in FIG. 2. In addition, the brake booster 6 has an electromechanical actuator 14; an actuator force produced by the actuator 14 can be transmitted to the push rod 13 likewise via the reaction disc 12. A symbolically depicted electric motor 15, which can also be a linear motor, is provided for force production. Actuator force can also be produced by means of an electromagnet (not shown). The reaction disc 12 is a rubber-elastic element that transmits the muscular force from the pedal rod 11 and the actuator force produced by the actuator 14 to the push rod 13 in the form of compressive forces.

The brake booster 6 is modified so that it can be used to act on the piston rod 11 and via it, on the brake pedal 5 with a force oriented in the opposite direction from the actuating direction. This force is referred to below as pedal force. For this purpose, the brake booster 6 has a switchable clutch, e.g. a solenoid-operated clutch 16. The solenoid-operated clutch 16 can connect the actuator 14 to the push rod 13 so that as mentioned above, a force oriented in the opposite direction from the actuating direction, i.e. toward the right in FIG. 2, can be exerted on the brake pedal 5 by the actuator 14 via the solenoid-operated clutch 16, the reaction disc 12, and the piston rod 11. By means of the brake booster 6 it is possible, even when there is no pressure in the master cylinder 4, to produce a pedal force that counteracts a muscular force exerted on the brake pedal 5 by a vehicle driver. Thus even without pressure in the master cylinder 4, it is possible to execute a precisely controlled actuation of the brake pedal 5.

The clutch or more precisely, the solenoid-operated clutch 16 is generally understood to be a coupling element via which an actuator force of the actuator 14, which acts in the opposite direction from the actuating direction of the master cylinder 4, can be transmitted to the piston rod 11 and the brake pedal 5 if the coupling element—i.e. the solenoid-operated clutch 16 in the exemplary embodiment—connects the actuator 14 to the piston rod 11 directly or indirectly via other components. Another conceivable coupling element would be a piston/cylinder unit that connects the actuator 14 to the piston rod 11, making it possible to confine a fluid volume in the cylinder, for example by means of a solenoid valve, so that the piston/cylinder unit provides a rigid connection between the piston rod 11 and the actuator 14. When the valve is open, the piston rod 11 can be moved relative to the actuator 14.

Preferably, the force that can be transmitted with the solenoid-operated clutch 16 or the coupling element in general is limited so that when the master cylinder 4 is actuated with muscular force while the solenoid-operated clutch 16 is engaged, it is possible to exert excess pressure on a potentially jammed actuator 14. For controlling or regulating purposes, the brake booster 6 has a force sensor 17 that is able to measure the muscular force exerted on the brake pedal 5, a travel sensor 18 that measures a movement of the actuator 14, and a position sensor 19 that measures a movement of the piston rod 11 relative to the actuator 14.

The electromechanical service brake system 3 of the brake system 1 has electromechanical brakes 20. In this embodiment, self-amplifying electromechanical brakes 20 have been selected, symbolized by the double wedges in the brake caliper. Self-amplifying brakes 20 are not crucial to the invention. Self-amplifying electromechanical disc brakes with electromechanical self-amplification by means of a wedge mechanism are known. For example, refer to patent application DE 100 56 451 A1. Hydraulic self-amplifying devices are also known. In addition, drum brakes whose brake shoes are applied electromechanically, i.e. are pressed against a brake drum for braking, are used as brakes 20. They have a self-amplification provided by means of one or two trailing brake shoes.

For controlling or regulating the electromechanical brakes 20, an electronic control unit 21 is provided, which also controls or regulates the brake booster 6 and the components of the hydraulic block 7, i.e. executes the slip control. The electronic control unit 21 receives signals from the sensors 17, 18, 19 of the brake booster 6 and from a pressure sensor 22 that measures the pressure in the master cylinder 4. FIG. 1 shows a pedal-travel sensor 23 that measures a travel of the brake pedal 5 and/or the piston rod 11. The pedal-travel sensor 23 can be provided in lieu of the travel sensor 18 and the position sensor 19 of the brake booster 6. The sensors 17, 18, 19, 22, 23 constitute an actuation sensor system that is able to measure a brake actuation. This is understood to mean a pedal travel as a function of a pedal force; instead of the pedal force, it is also possible to measure the pressure in the master cylinder 4. In other words, the so-called pedal characteristic is measured. The sensors are partially redundant; the pressure sensor 22 or the force sensor 17 and pedal-travel sensor 23 or the travel sensor 18 and position sensor 19 is/are sufficient by itself/themselves.

The hydraulic service brake system 2 is embodied as a single-circuit system because in the event of a failure, braking is still possible by means of the electromechanical service brake system 3. During a brake actuation, i.e. while the brake pedal 5 is being pressed down, if no pressure is built up with the master cylinder 4 due to a malfunction such as a leak in the hydraulic service brake system 2, then the braking is executed with the electromechanical service brake system 3, as mentioned above. By means of the brake booster 6, a pedal force oriented in the opposite direction from the actuation is produced and exerted on the brake pedal 5 so that when stepping on the brake pedal 5, a vehicle driver notices a resistance, which makes a precise control of the brake actuation possible or at least better than it would be with a completely or almost completely force-free brake pedal 5. As described above, the pedal force acting in the opposite direction from the actuation is produced through engagement of the solenoid-operated clutch 16 and a supply of current to the actuator 14 so that the actuator force is oriented in the opposite direction from the actuation. Even the pressure in the master cylinder 4 during a brake actuation is reduced due to a malfunction, i.e. is lower than usual, the brake booster 6 can be used to increase the pedal force in the above-described fashion. With the invention, the usual pedal characteristic, i.e. the usual pedal force as a function of pedal travel, is possible independent of a buildup of pressure with the master cylinder 4. Also in the event of a malfunction, a pedal force that is noticeably different from the usual pedal force can be produced in order to alert a vehicle driver that the brake system 1 is not fully functional. Such a pedal force nevertheless permits or in any case facilitates a precise control of the brake actuation.

The brake system 1 can also be referred to as a hybrid brake system because it combines two different service brake systems 2, 3, namely the hydraulic service brake system 2 and the electrochemical service brake system 3.

The modification of the brake booster 6, which enables the production of a pedal force acting in the opposite direction from the actuation of the master cylinder 4, permits the brake booster 6 to simultaneously constitute a pedal simulator that can produce a pedal force even when there is no pressure in the master cylinder 4.

The foregoing relates to the preferred exemplary embodiment of the invention, it being understood that other variants and embodiments thereof are possible within the spirit and scope of the invention, the latter being defined by the appended claims.

The invention claimed is:

1. A motor vehicle brake system, which includes a hydraulic service brake system and an additional service brake system, the hydraulic service brake system having a muscular force-actuatable master cylinder with a brake booster and one or more hydraulic wheel brakes that are connected to the master cylinder, the brake booster configured to produce a pedal force that counteracts an actuation force, wherein said brake booster includes;
   a push rod operable to actuate the master cylinder;
   a pedal rod connected to a muscular force-actuatable brake pedal and operable to apply an actuation force to said push rod upon actuation of the brake pedal;
   an actuator selectively engageable to produce the pedal force by engagement to a selected one of said pedal rod and said push rod; and
   a motor coupled to said actuator and operable to drive said actuator toward said pedal rod when said actuator is engaged to one of said pedal rod and said push rod, thereby applying a force on said pedal rod that counteracts the actuation force.

2. The brake system according to claim 1, wherein the brake system has an electromechanical service brake system with electromechanical wheel brakes as the additional service brake system.

3. The brake system according to claim 2, wherein the electromechanical wheel brakes of the electromechanical service brake system are self-amplifying.

4. The brake system according to claim 1, wherein the hydraulic service brake system has an electromechanical brake booster.

5. The brake system according to claim 2, wherein the hydraulic service brake system has an electromechanical brake booster.

6. The brake system according to claim 3, wherein the hydraulic service brake system has an electromechanical brake booster.

7. The brake system according to claim 1, further comprising a clutch disposed between said actuator and said push rod, said clutch operable to selectively engage said actuator to and disengage said actuator from said push rod.

8. The brake system according to claim 1, wherein said actuator defines a bore therethrough and said pedal rod extends through said bore.

9. The brake system according to claim 1, wherein said motor is selectively operable to drive said actuator toward said push rod, thereby applying a force assisting the actuation force.

10. The brake system according to claim 1, further comprising:
   a sensor for detecting a loss of pressure in the master cylinder; and
   a controller for activating the actuator and motor in response to a signal from said sensor to produce a force counteracting the actuation force.

11. The motor vehicle brake system of claim 1, wherein the actuator and motor are configured to selectively apply the pedal force and said force generated by said motor to the pedal rod.

12. A method for controlling a motor vehicle brake system, which includes a hydraulic service brake system and an additional service brake system, the hydraulic service brake system having a muscular force-actuatable master cylinder with a brake booster and one or more hydraulic wheel brakes that are connected to the master cylinder, the brake booster including a push rod operable to actuate the master cylinder and a pedal rod connected to a muscular-force actuated brake pedal operable to apply an actuation force to the push rod, the method comprising the steps of:
   measuring a brake actuation travel of the brake pedal via an actuation sensor system;
   comparing the actuation force to an expected actuation force for the brake actuation travel; and
   if the actuation force achieved during the actuation travel is less than the expected actuation force, producing a pedal force that counteracts the actuation force via the brake booster.

13. The method according to claim 12, further including the step of producing the expected actuation force.

14. The brake system according to claim 12, further comprising operating the brake booster to produce a force assisting the actuation force if a usual actuating force is achieved.

15. The method for controlling a motor vehicle brake system of claim 12, wherein the step of producing a pedal force includes applying a force on the pedal rod.

\* \* \* \* \*